P. H. WILKINSON.
RETREAD VULCANIZER.
APPLICATION FILED AUG. 21, 1918.

1,297,765.

Patented Mar. 18, 1919.

WITNESS:

INVENTOR.
Paul H. Wilkinson.
BY
Hazard & Miller
ATTORNEYS

UNITED STATES PATENT OFFICE.

PAUL H. WILKINSON, OF SAN BERNARDINO, CALIFORNIA.

RETREAD-VULCANIZER.

1,297,765.  Specification of Letters Patent.  Patented Mar. 18, 1919.

Application filed August 21, 1918. Serial No. 250,778.

*To all whom it may concern:*

Be it known that I, PAUL H. WILKINSON, a citizen of the United States, residing at San Bernardino, in the county of San Bernardino and State of California, have invented new and useful Improvements in Retread-Vulcanizers, of which the following is a specification.

My invention relates to retread vulcanizers, and consists of the novel features herein shown, described and claimed.

My object is to make cooling ends, so as to taper and overlap the cures and prevent the hot rubber from running out of the ends of the molds.

Figure 1:
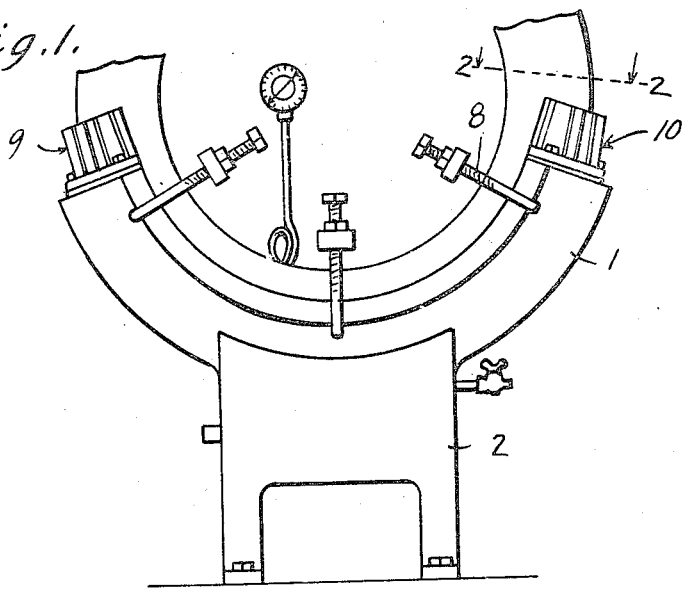
Figure 1 is a side elevation of a retread vulcanizer provided with cooling ends in accordance with the principles of my invention, parts of the tire casing being broken away.

A steam jacket mold 1 is mounted upon a stand 2 and the mold has a shallow cavity 3 especially adapted to receive a tire casing 4 for curing a retread upon the tire casing. The gum rubber is applied to the periphery of the tire casing 4 to produce the retread 5, and the casing is placed in the cavity 3. A sand bag 6 is placed in the casing. A compression plate 7 is placed against the bag 6, and the compression screws 8 are operated to press the plate 7 against the bag 6 and press the bag against the tire casing 4 to press the tire casing 4 firmly against the gum rubber and hold the gum rubber until it is cured. The mold 1 is designed to cure a complete retread upon a tire casing 4 at three operations. In actual practice when the gum rubber 5 is in the mold cavity 3 and being cured the gum rubber melts, and more or less of the gum rubber runs out of the ends of mold 1; furthermore the gum rubber is cured thoroughly up to a fixed line, and this fixed line is marred by the gum running out of the end of the mold and the result is that the finished retread shows scars between the ends of the cures, and the joints between the cures are more or less defective.

Figure 2:
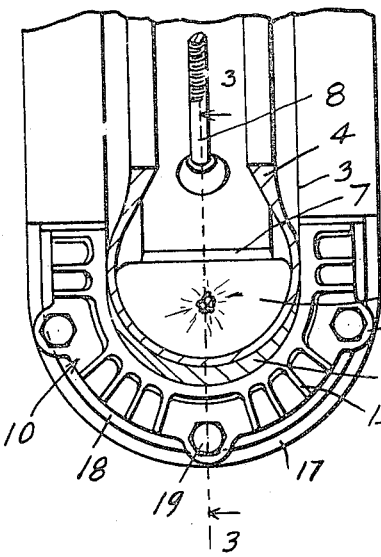
Fig. 2 is a cross sectional detail on the line 2—2 of Figs. 1 and 3, and looking in the direction indicated by the arrows.
Figure 3:
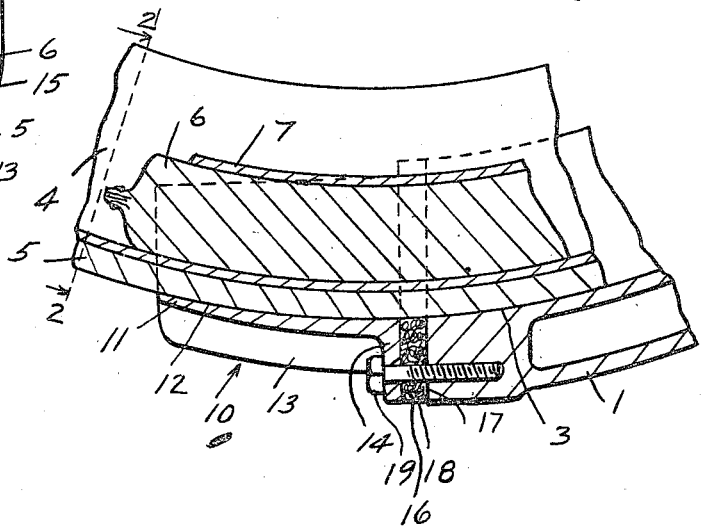
Fig. 3 is a vertical longitudinal sectional detail on the line 3—3 of Fig. 2.

In order to overcome this difficulty I have devised the cooling ends 9 and 10. The cooling ends 9 and 10 are substantially alike, and I have shown the details of the cooling end 10 in Figs. 2 and 3. The cooling end 10 consists of a comparatively thin shell 11 formed of aluminum, cast-iron, or the like, and the shell 11 forms an extension 12 of the mold cavity 3. Radiating ribs 13 extend outwardly from the shell 11. A flange 14 extends outwardly from the end of the shell and the shell 11 tapers from the flange 14 to the outer end, and the flange 14 connects the inner ends of the radiating ribs 13. Ears 15 extend outwardly from the flange 14, and the face 16 of the flange 14 and the ears 15 fits the end face 17 of the mold 1. A thick pad 18 of asbestos paper or other suitable non-heat conducting material is placed between the faces 16 and 17. Cap screws 19 are inserted through the ears 15, through the pad 18 and tapped into the end of the mold 1.

In the use of my cooling ends, the bag 6 and the compression plate 7 should be long enough to extend to the outer ends of the cooling ends, so as to hold the tire casing 4 and the retread rubber 5 firmly in the extension cavity 12, and prevent the hot rubber in the cavity 3 from running out of the mold 1.

The extension cavity 12 should match with the cavity 3. As shown the cavity 3 and the extension cavity 12 are for plain treads. If the mold is to be equipped for non-skid treads, then the matrix face of the extension cavity 12 should match the matrix face of the mold cavity 3, and if a shell or removable matrix is used, the shell or removable matrix should extend to the outer ends of the cooling ends 9 and 10.

In the practical operation of the cooling ends 9 and 10 the heat from the mold 1 will be partly communicated through the pad 18 to the shell 11, and will be rapidly radiated from the shell 11 by exposure to the air, and by the radiating ribs 13, so that the outer end of the shell will be cool enough not to melt the gum rubber, and the joint between the cured rubber in the cavity 3 and the uncured rubber outside of the outer end of the shell 11 will be tapered, so that when the tire casing and retread is finished the joints between two cures will be overlapped or spliced instead of being straight, as would be the case without the use of the cooling ends; furthermore pressure will be exerted from the compression screws 8 through the compression plate 7, the bag 6, and the casing 4, to the retread 5 and prevent the hot rubber from expanding and producing a spongy product.

Various changes may be made without departing from the spirit of my invention as claimed.

I claim:

A cooling end for a retread vulcanizer comprising, a shell forming an extension cavity; radiating ribs extending from the shell; an attaching flange extending from the shell and to fit the end of a mold; ears extending from the flange; a pad of non-heat conducting material fitting against the flange and ears; and cap screws inserted through the flange and pad, and adapted to be screwed into the end of the mold.

In testimony whereof I have signed my name to this specification.

PAUL H. WILKINSON.